(12) United States Patent
Harra (10) Patent No.: US 12,510,116 B2
(45) Date of Patent: Dec. 30, 2025

(54) THREE BEARING POSITIONING SYSTEM (71) Applicant: John Martin Harra, New York, NY (US)

(72) Inventor: John Martin Harra, New York, NY (US)

( * ) Notice: Subject to any disclaimer, the term of this patent is extended or adjusted under 35 U.S.C. 154(b) by 0 days.

(21) Appl. No.: 18/445,826

(22) Filed: Feb. 23, 2024

(65) Prior Publication Data

US 2025/0271030 A1 Aug. 28, 2025

(51) Int. Cl.
*F16C 29/00* (2006.01)
*A47B 97/00* (2006.01)

(52) U.S. Cl.
CPC .......... *F16C 29/005* (2013.01); *A47B 97/001* (2013.01)

(58) Field of Classification Search
None
See application file for complete search history.

(56) References Cited

U.S. PATENT DOCUMENTS

| | | | | |
|---|---|---|---|---|
| 4,844,624 A | * | 7/1989 | Teramachi | F16C 29/0604 384/43 |
| 5,308,170 A | * | 5/1994 | Yamaguchi | F16C 29/005 384/43 |
| 6,338,573 B1 | * | 1/2002 | Michioka | F16C 19/362 104/106 |
| 8,584,592 B1 | * | 11/2013 | Shu | F16C 29/04 104/106 |
| 2021/0354383 A1 | | 11/2021 | Harra et al. | |

FOREIGN PATENT DOCUMENTS

| | | | | |
|---|---|---|---|---|
| CN | 107100928 A | * | 8/2017 | ............ F16C 29/005 |
| EP | 1059464 A1 | * | 12/2000 | ............ F16C 19/362 |
| EP | 1555447 A2 | * | 7/2005 | ............ F16C 19/362 |
| WO | WO-2009003843 A2 | * | 1/2009 | ............ F16C 29/005 |
| WO | WO-2013027325 A1 | * | 2/2013 | ............ F16C 19/502 |
| WO | WO-2023282504 A1 | * | 1/2023 | ............ B60N 2/072 |

* cited by examiner

*Primary Examiner* — Steven M Marsh (57) ABSTRACT

A three-bearing system (TBS) running on a hexagonal rail behind a false wall enables a TV hung on a first wall to move horizontally along the first wall, traverse an inside corner formed by the first wall and a second wall, and move horizontally along the second wall. A yoke supports the three bearings and is attached to the TV by a rigid support arm (made of metal, carbon fiber, or other structural support material) that has passed through one or more horizontal slots in a false wall. The protruding support arms holding the TV in place are attached to the hexagonal rail system that is permanently attached to the structure of the building. Through the user's selected movement or positioning, viewing the TV is easier and more comfortable from many positions in a room.

13 Claims, 14 Drawing Sheets

THREE BEARING POSITIONING SYSTEM

TECHNICAL FIELD

This invention relates to positioning systems. More particularly, this invention relates to positioning a television (TV) or other flat panel visual display device on one or more flat surfaces.

BACKGROUND

Flat panel devices such as large screen TVs, computer displays, pictures, paintings, and the like normally are fixedly mounted to a wall surface, a ceiling, or a fixed horizontal surface such as a credenza top, table top, bureau top, or a wall niche. If one desires to change the location of the flat panel display device on a wall, one has to remove the flat panel display device from its mounting on the wall, remount it in the new location, and then repair the damage to the wall where the visual display device originally was mounted. If one desires to put the TV back to where it was, or to a new location, the process has to be repeated. The task of safely hanging a large screen TV requires a minimum of three people, two people to lift the TV and another person to direct the two people holding the large screen TV to reposition the TV for best TV viewing. It would be advantageous to be able to reposition a large screen TV without having to go to such lengths.

Published and Allowed US Patent Application US 2021/0354383 A1 refers, in FIG. 14, to a biaxial positioning system for moving a flat panel object hung from a flat surface in two dimensions. FIG. 15 of the Published Application refers to a uniaxial embodiment of the positioning system. The apparatus in the published patent application cannot (1) traverse an inside corner, and (2) does not provide a mechanism to support straight or curved false walls. False walls provide permanent cover for the mechanical components so that these components cannot to be seen from the room side of the false wall. The published patent application does not address how a hidden linear rails can guide a TV straight or around an inside curve. The published patent application does not address hiding rigid support components (made of metal, carbon fiber or other structural support material) required to move the TV behind "floating" false walls. The published patent application has the TV mounted to an exposed multi-linear, non-parallel, and non-coplanar rail system, which is mounted to a room's structural support wall, and not a hidden hex rail system mounted to a room's structural support wall.

SUMMARY

Applicant has solved the problems of the prior positioning systems by devising a positioning system whereby a flat panel display device can be slid horizontally across a flat surface without removing it from its mounting. In addition to allowing movement with respect to the flat surface on which it is mounted, Applicant's invention allows movement of the flat panel display device to an adjacent flat surface around an inside corner formed by the flat surface on which the visual display device originally was mounted and an adjacent flat surface on which the visual display device is to be newly located. The mechanism to accomplish this can be hidden behind a false wall to maintain the aesthetics of the room environment.

DETAILED DESCRIPTION

Figure 1:
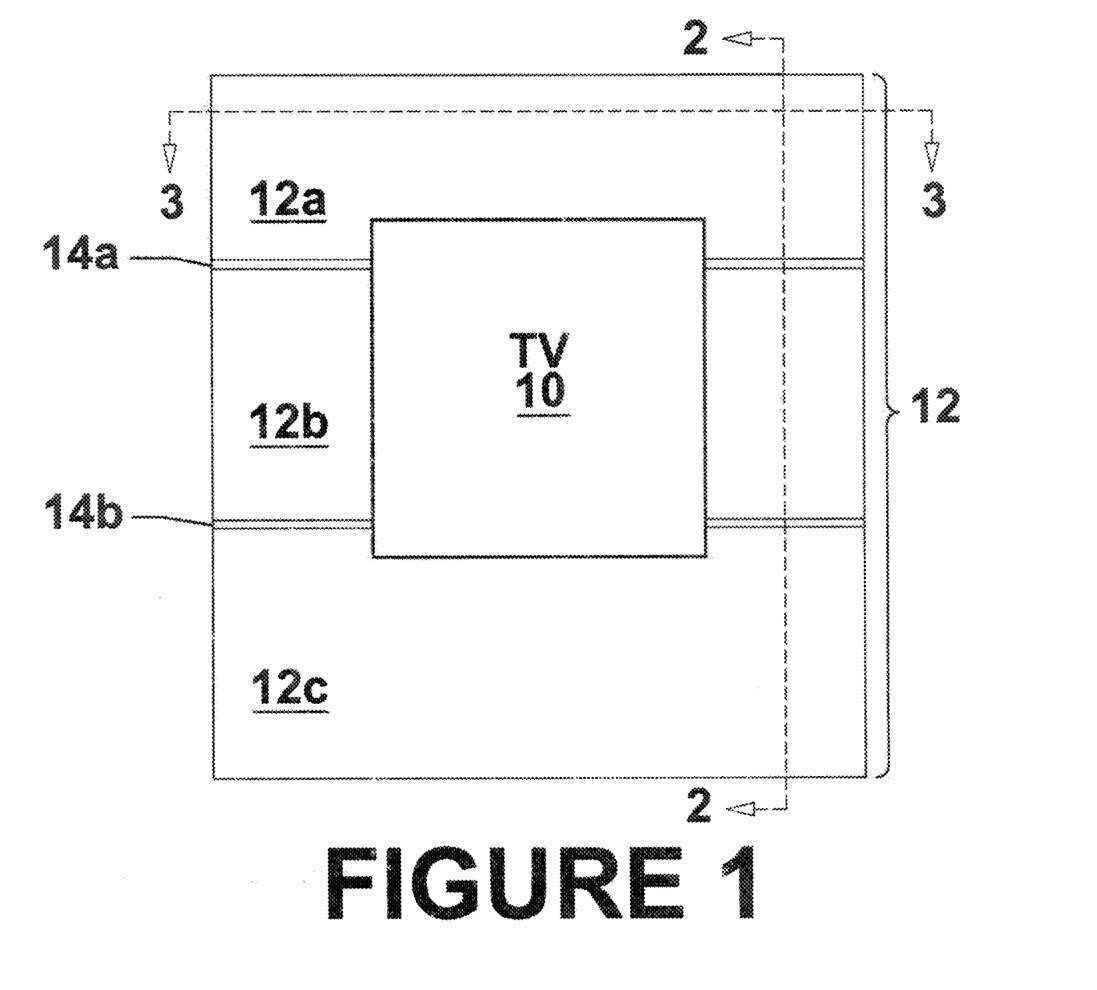
FIG. 1 is a front view of an example of a positioning system in accordance with this invention.

FIG. 1 shows a rectangular flat panel visual display device 10 mounted on a vertically disposed wall. The flat panel display device 10 can be a television (TV), a computer monitor, a picture, a photo, a painting, or similar visual display device. The rest of the discussion herein will assume that the visual display device 10 is a TV, but the invention is not limited to TV's. A false wall or hung wall 12 comprising a top section 12a, a middle section 12b, and a bottom section 12c hides the structure of a positioning system described below. As shown most clearly in FIG. 1A, support elements 30a, 30b, 30c, and 30d at each of the four corners of the TV 10 extend through gaps 14a and 14b in the false wall 12. The four support elements secure the TV 10 to the wall and connect it to the positioning system behind the false wall 12 in FIG. 1.

Figure 2:
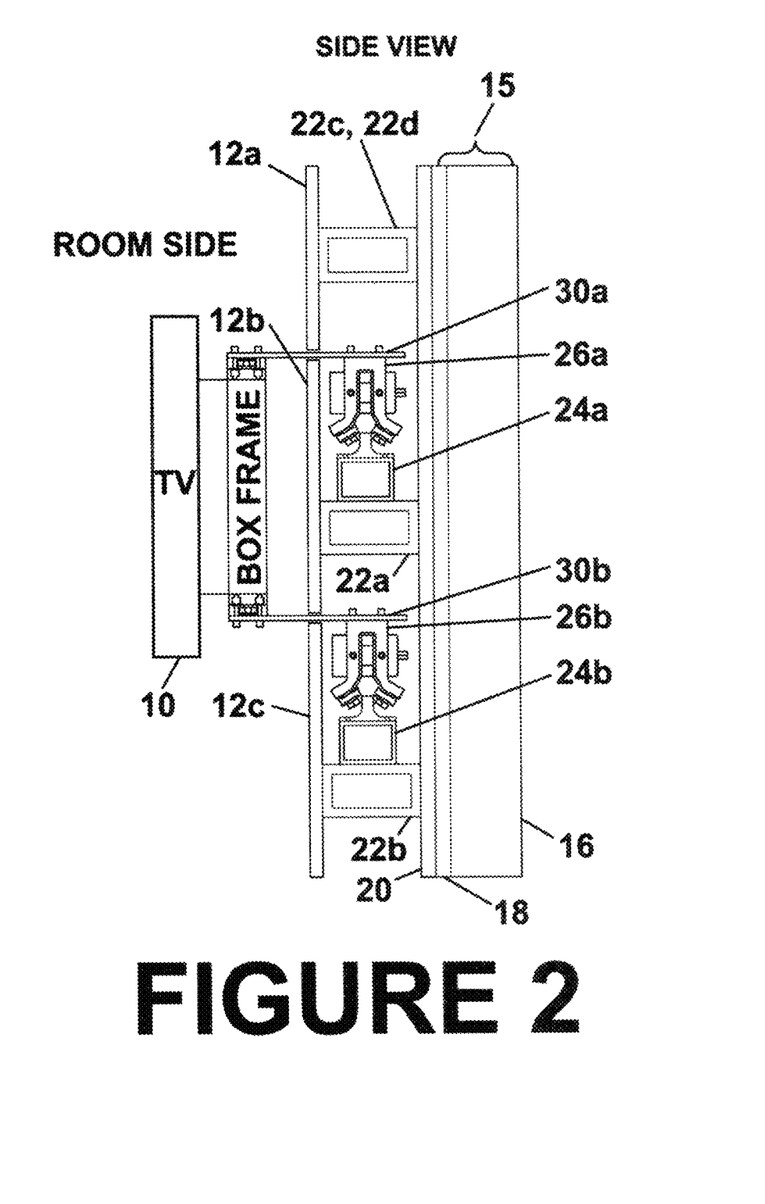
FIG. 2 is a side sectional view of the example of the positioning system of FIG. 1 taken along section line 2-2 shown in FIG. 1.

FIG. 2 is an edge view of the apparatus of FIG. 1 taken from the right hand side of FIG. 1. FIG. 2 shows a vertical wall 15 commonly used in conventional building construction. The vertical wall 15 comprises a series of vertical 2×4 or 2×6 wooden studs 16 covered with one or more layers of gypsum board or sheetrock 18. In this example of the invention, the sheetrock 18 is covered with a layer of plywood 20 that provides a secure anchor surface for the positioning system shown in FIG. 2.

Figure 3:
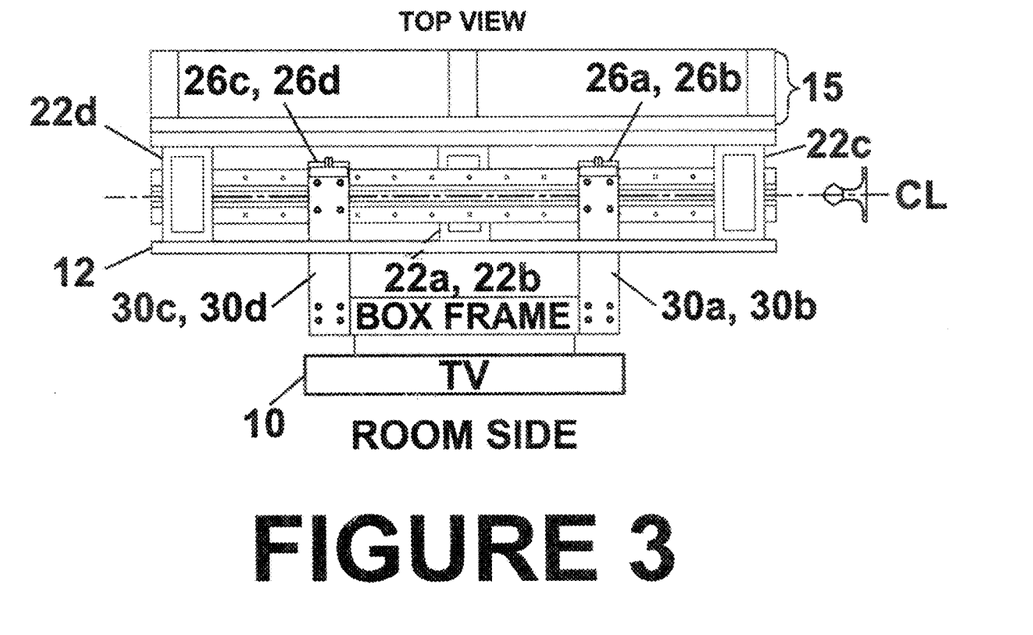
FIG. 3 is a top sectional view of the example of the positioning system of FIG. 1 taken along section line 3-3 shown in FIG. 1.

Standoff box frames 22a, 22b, and 22c are attached to the plywood layer 20. They connect the plywood layer 20 to the backside of the false wall 12 and provide support for the wall 12. In addition, box frames 22a and 22b support hex rails 24a and 24b. The size of the box frame standoffs 22a, 22b, and 22c is such that an appropriate amount of space is provided between the false wall 12 and the plywood layer 20 to accommodate the positioning equipment shown in FIGS. 2 and 3 described below. The box frames 22a, 22b, and 22c can be made of any suitable structural material such as aluminum.

The positioning system comprises two hex rails 24a and 24b that extend horizontally along wall 15 behind the false wall 12. The two hex rails 24a and 24b extend parallel to the gaps 14a and 14b. The hex rails 24a and 24b are located on adjacent walls 15 and 17 shown most clearly in FIGS. 4a, 4b, 4c, and 4d. As also shown in FIGS. 4a, 4b, 4c, and 4d, the hex rails 24a and 24b each comprise a first straight portion 25a that extends horizontally across the wall 15, a curved portion 29a that extends around an inside corner 19, and a second straight portion 27a that extends horizontally across another wall 17 that intersects wall 15. Wall 17 is similar to wall 15. Like wall 15, wall 17 supports a false wall that has upper and lower gaps as in FIG. 1. Although not shown in FIGS. 4a, 4b, and 4c, there is another rail 24b underneath rail 24a. Rail 24b is configured like rail 24a.

Figure 1A:
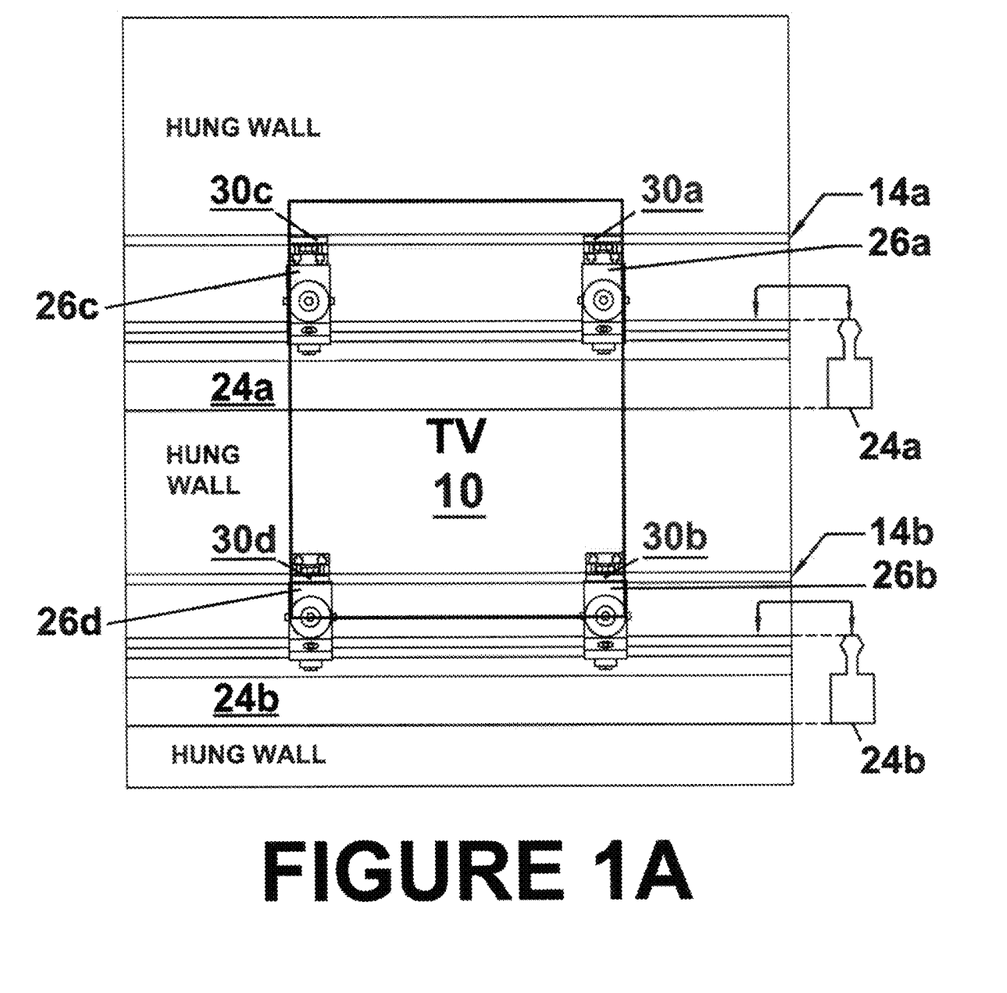
FIG. 1A is another front view of the apparatus of FIG. 1 illustrating what's behind the TV and the false wall shown in FIG. 1.
Figure 4A:
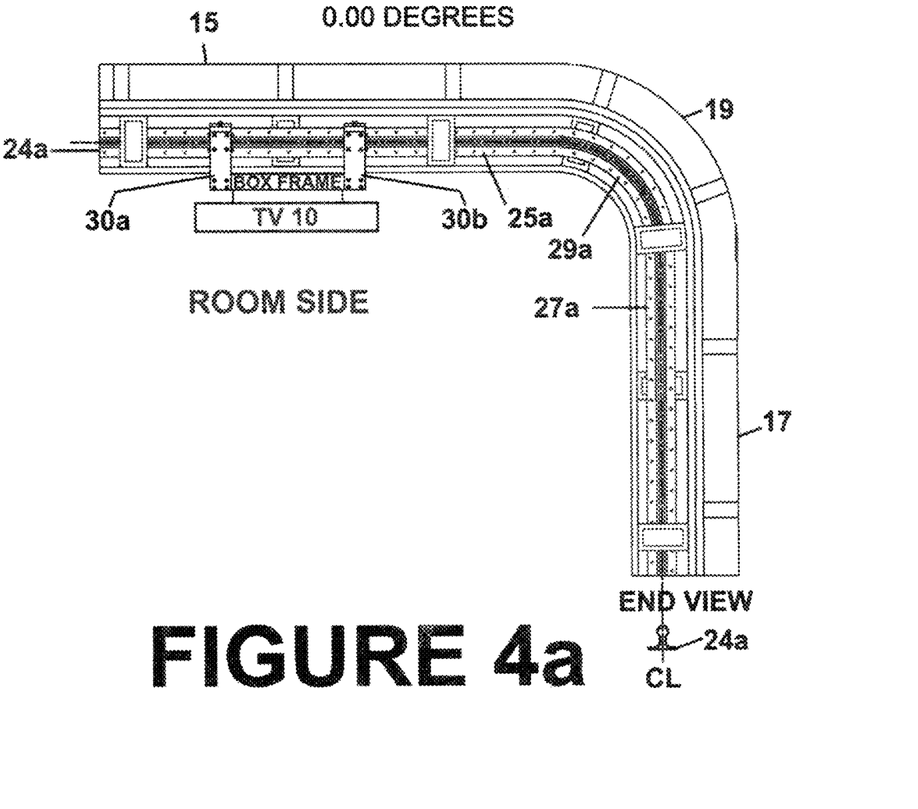
FIGS. 4a, 4b, and 4c are top views of the example of the positioning system of FIG. 1 illustrating traversal of an inside corner formed by two intersecting adjacent walls.
Figure 4B:
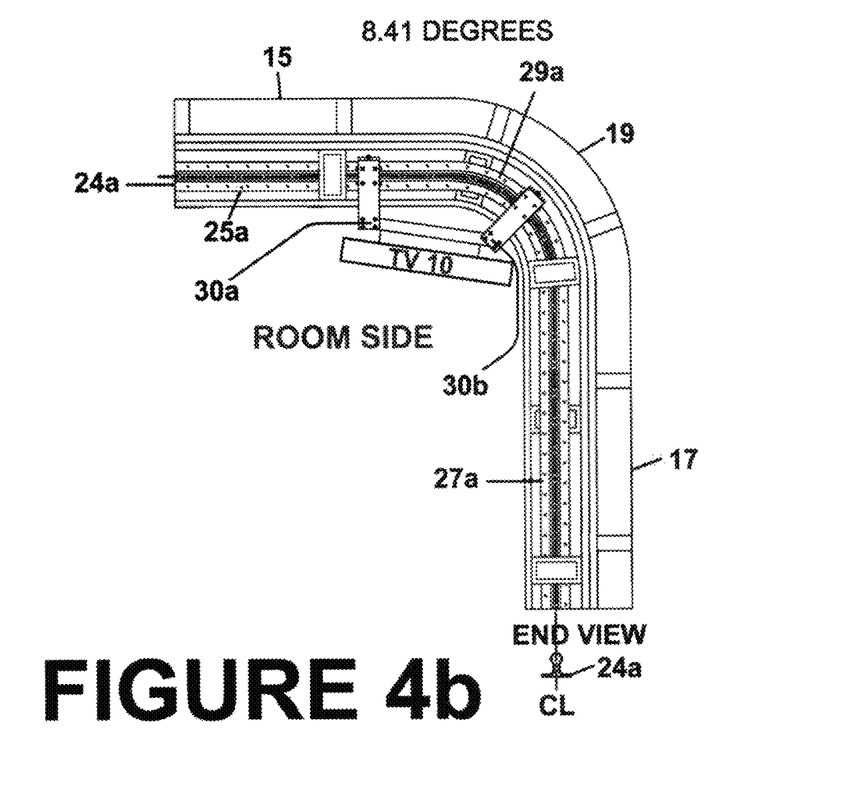
Figure 4C:
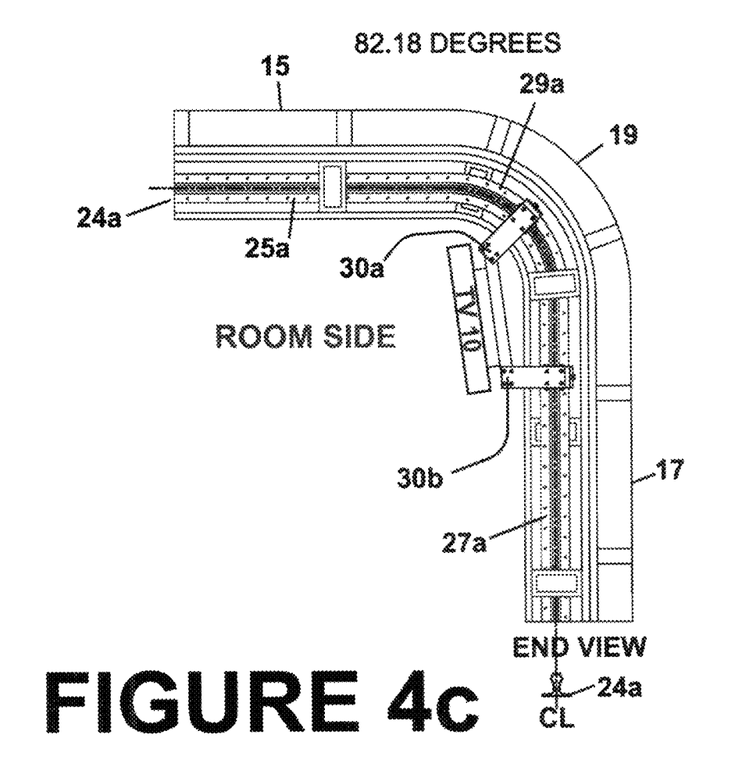

Four identical yoke assemblies 26a, 26b, 26c, and 26d, one for each of the four corners of the rectangular TV 10, support the TV 10 and connect it to the rails 24a and 24b as shown in FIG. 1A. Yoke assembly 26a connects the upper right hand corner of the TV 10 in FIG. 1 to the upper rail 24a. Yoke assembly 26b connects the lower right hand corner of the TV 10 in FIG. 1 to the lower rail 24b. Yoke assembly 26c connects the upper left hand corner of the TV 10 in FIG. 1 to the upper rail 24a. Yoke assembly 26a connects the lower left hand corner of the TV 10 in FIG. 1 to the lower rail 24b. The yoke assemblies ride along the rails 24a and 24b and carry the TV 10 horizontally with them. Rail 24a comprises a first straight portion 25a that extends horizontally along wall 15, a second straight portion 27a that extends horizontally along wall 17, and a curved portion 29a connecting the first and second portions of rail 24a. Rail 24b is underneath rail 24a in FIGS. 4a, 4b, and 4c and comprises a first straight portion 25b that extends horizontally along wall 15, a second straight portion 27b that extends horizontally along wall 17, and a curved portion 29b connecting the first and second portions of rail 24c. As shown in FIGS. 4a, 4b, and 4c, the TV 10 can be positioned horizontally, either manually or by means of a motor drive, along straight portions 25a and 25b of the rails 24a and 24b and across wall 15. Similarly the TV 10 can be positioned horizontally along straight portions 27a and 27b of rails 24a and 24b and across another wall 17 that intersects wall 15. The TV 10 can be moved horizontally from wall 15 to 17 and from wall 17 to wall 15 across an inside corner 19 formed by the intersection of adjacent walls 15 and 17. FIG. 4a shows the TV 10 traveling horizontally along wall 15 and approaching the inside corner formed by walls 15 and 17. FIG. 4b shows the TV 10 traversing the inside corner. FIG. 4C shows the TV 10 exiting the inside corner and beginning its horizontal movement along wall 17.

Figure 5:
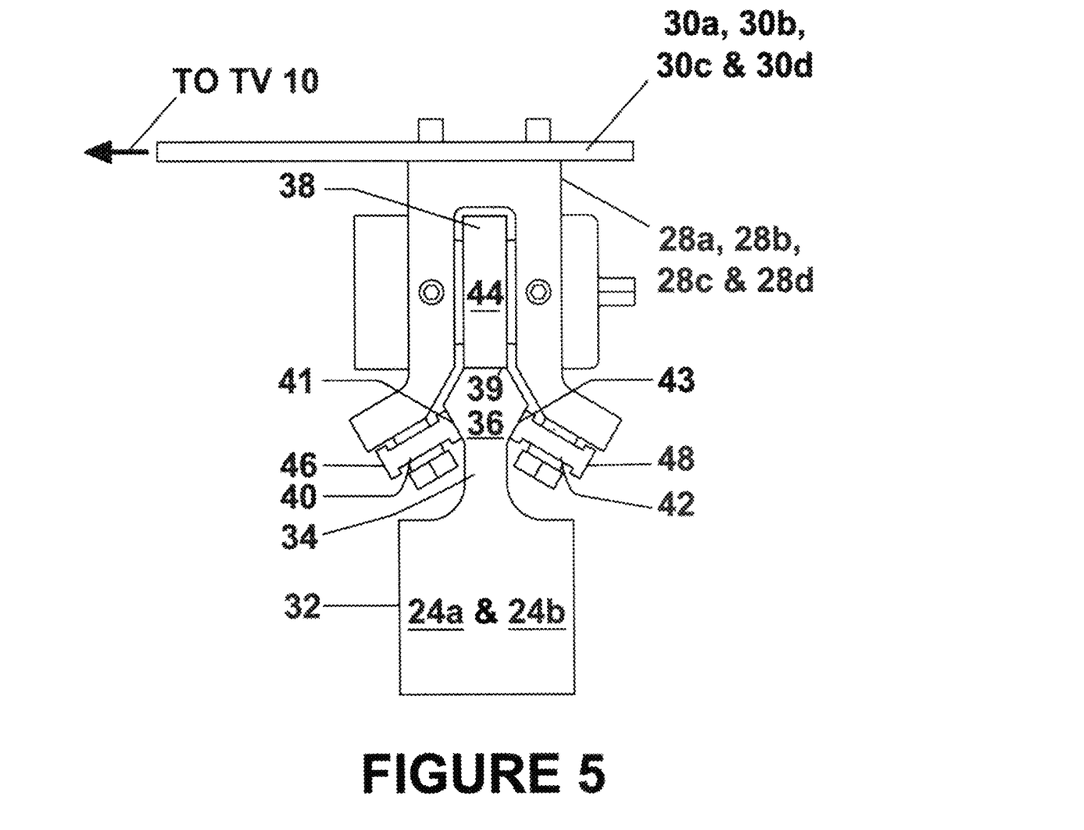
FIG. 5 depicts a side view of a magnified yoke assembly.

FIG. 5 is a magnified view of one of the four yoke assemblies 26a, 26b, 26c, or 26d referred to above that illustrates how the yoke assemblies are connected to the hex rails 24a and 24b. The other three yoke assemblies are the same. Each yoke assembly comprises an inverted U-shaped yoke 28a, 28b, 28c, or 28d more clearly shown in the perspective of FIG. 6. Support elements 30a, 30b, 30c, and 30d, shown most clearly in FIG. 1A, are attached to the top of a respective yoke 28a, 28b, 28c, or 28d. The support elements 30a, 30b, 30c, and 30d extend through the false wall 12 through the slots 14a and 14b and are connected to the corners of the TV 10.

FIG. 5 shows that the hex rails 24a or 24b each comprise a rectangular base 32, a stem portion 34 protruding from the top of the base portion 32, and a hexagonal cross-section top portion 36 sitting atop the stem portion 34. The hexagonal top portion 36 provides three bearing surfaces that interact with a tri-bearing system (TBS) mounted on the yoke 28a, 28b, 28c, or 28d. The bearing surfaces are each angularly separated from the other two bearing surfaces by an angle of 120 degrees. Each of the three bearings in the TBS defines axes of rotation separated from one another by the same 120 degrees.

A bearing 38 is located between the arms of the inverted U-shaped yoke 28a, 28b, 28c, or 28d. Bearing 38 rolls along the top surface 39 of the hexagonal top of the rail 24a or 24b. The top surface thus provides a load-bearing surface for the positioning system of this invention. Bearings 40 and 42 located at the ends of the arms of the inverted U-shaped yoke roll along surfaces 41 and 43, respectively, and maintain proper alignment of the yoke assembly as it moves along the hex rails 24a and 24b.

The bearings 38, 40, and 42 are standard roller element bearings, for example, ball bearings or roller bearings. These bearings comprise two different diameter concentric rings that are rotatable with respect to one another. The concentric rings thus form a bearing race. Balls or rollers are confined between the rings that facilitate smooth rotation of the bearing. The outer circumference of each of the bearings in FIG. 5 may be covered with a layer of elastomeric or rubber-like material 44, 46, and 48 that prevents slippage with respect to rails 24a and 24b. The bearings 38, 40, and 42 thus roll along their respective bearing surfaces 39, 41, and 43 similar to the way automobile tires roll along a road. This layer of elastomeric or rubber-like material on ball bearings 38, 40, and 42 offers quieter, smoother, rumble free movement, and adds a greater lifespan of the bearing surfaces on the hex rails 24a and 24b.

Figure 6:
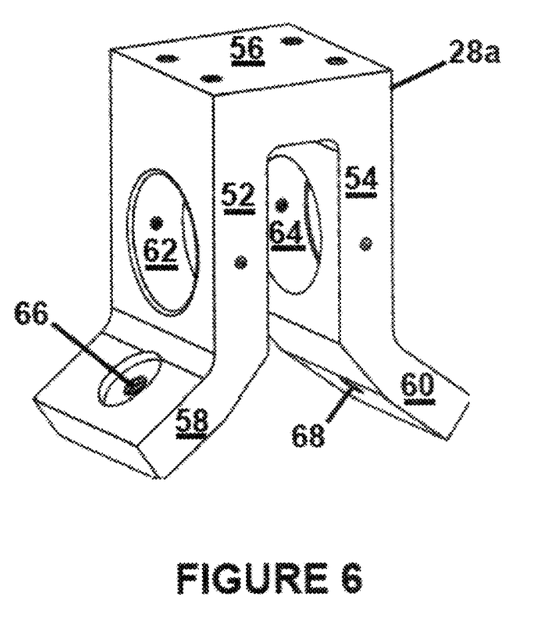
FIG. 6 is a perspective view of a yoke.

FIG. 6 is a perspective view of one of the yokes 28a in the yoke assemblies. Yokes 28b, 28c, and 28d are the same as yoke 28a in FIG. 6. Yoke 28a is an inverted U-shaped structure comprising vertical arms 52 and 54 connected by a top horizontal portion 56. The ends of the arms 52 and 54 end in outwardly flared portions 58 and 60. Vertical arms 52 and 54 contain cylindrical openings 62 and 64 for the receipt of two ends of a roller element bearing 38 that supports the TV 10. The flared portions 58 and 60 have cylindrical openings 66 and 68 for the receipt of the alignment bearings 40 and 42. The support element 30a is attached to the top portion 56 of the yoke 28a in FIG. 6.

Figure 7A:
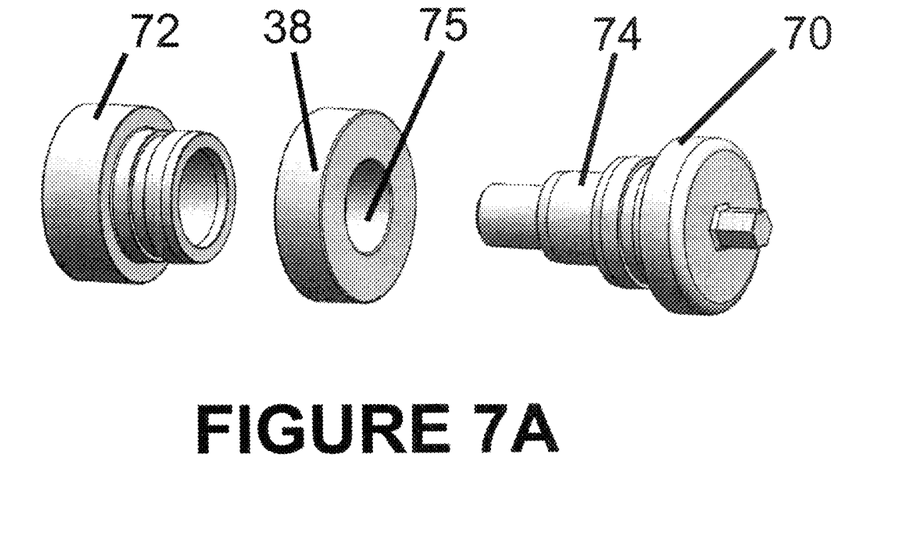
FIG. 7A is an exploded view of a top load bearing and two fixtures that attach the top load bearing to a yoke.
Figure 7B:
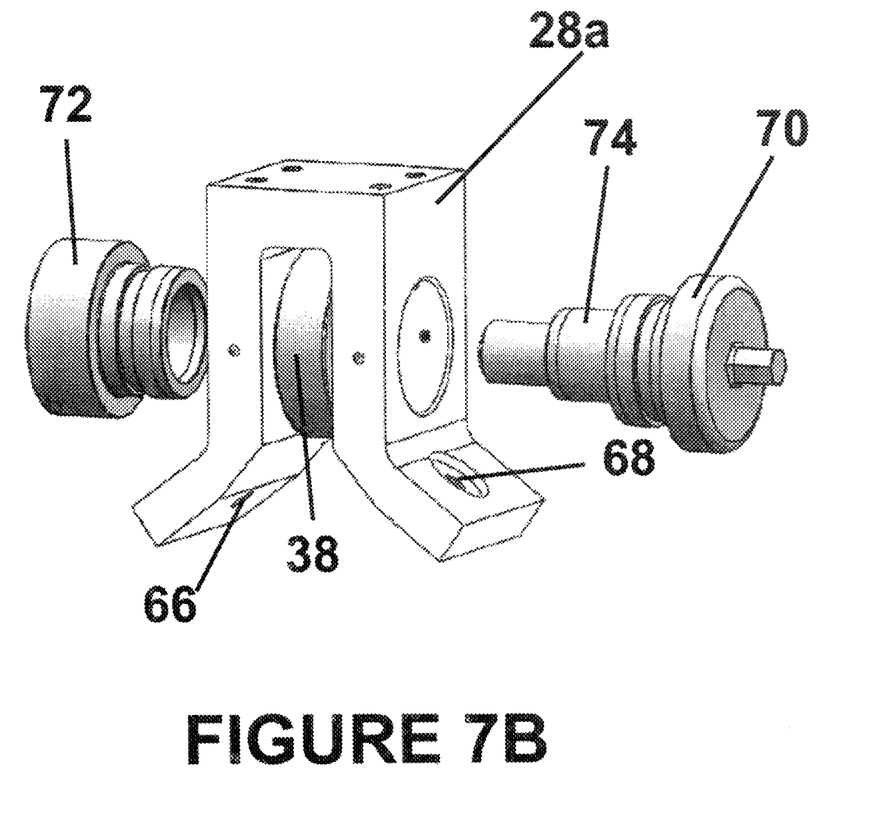
FIG. 7B adds a yoke to the exploded view of FIG. 7A.

FIG. 7A is an exploded view of the top bearing 38 and two fixtures 70 and 72 that attach the top bearing 38 to one of the yokes 28a. FIG. 7B adds the yoke 28a to the parts shown in FIG. 7A. Attachment of the other top bearings to their respective yokes 28b, 28c, and 28d is similar to that shown in FIGS. 7A and 7B. Bearing fixtures 70 and 72 extend through openings 62 and 64 in the yoke 28a to provide a cylindrical shaft 74 extending across the arms 52 and 54 of the yoke 28a. When fully assembled, the cylindrical shaft 74 extends through a circular opening 75 in bearing 38. The bearing 38 spins about this shaft 74 when the yoke 28a is moved along hex rail 24a. Top bearings associated with yokes 28b, 28c, and 28d are structured and operate in the same way that bearing 38 associated with yoke 28a is structured and operates.

Figure 8:
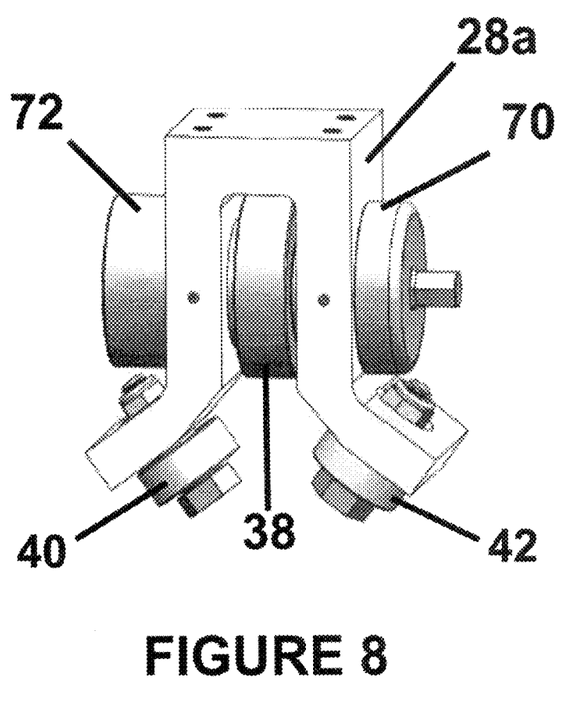
FIG. 8 is a perspective view of a yoke assembly to which is attached a top load bearing and two alignment bearings.
Figure 9A:
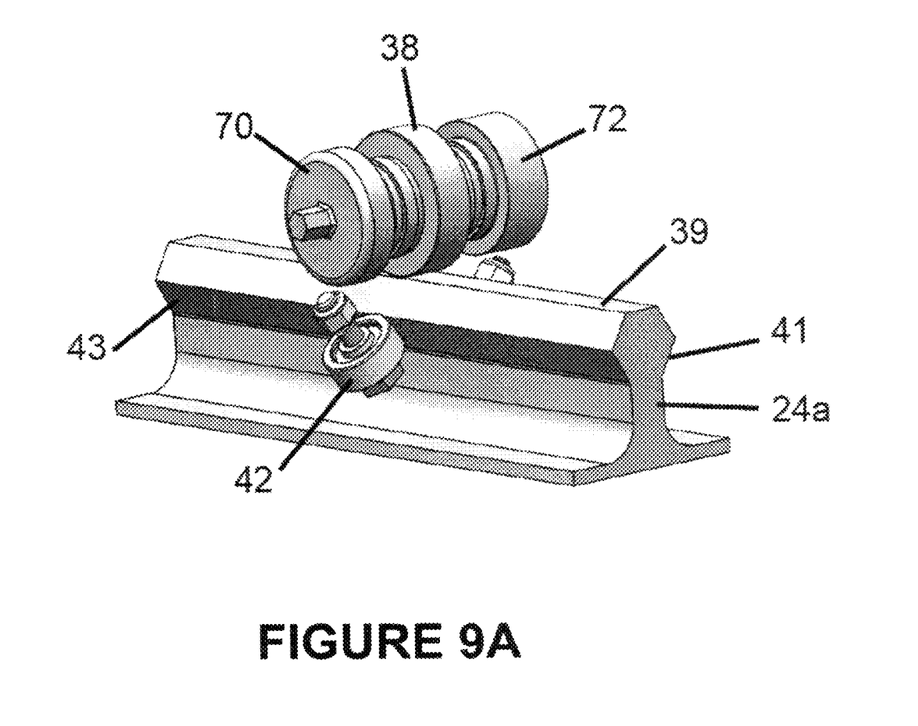
FIG. 9A is an exploded view of a hex rail and three bearings illustrating how the bearings ride on the hex rail.
Figure 9B:
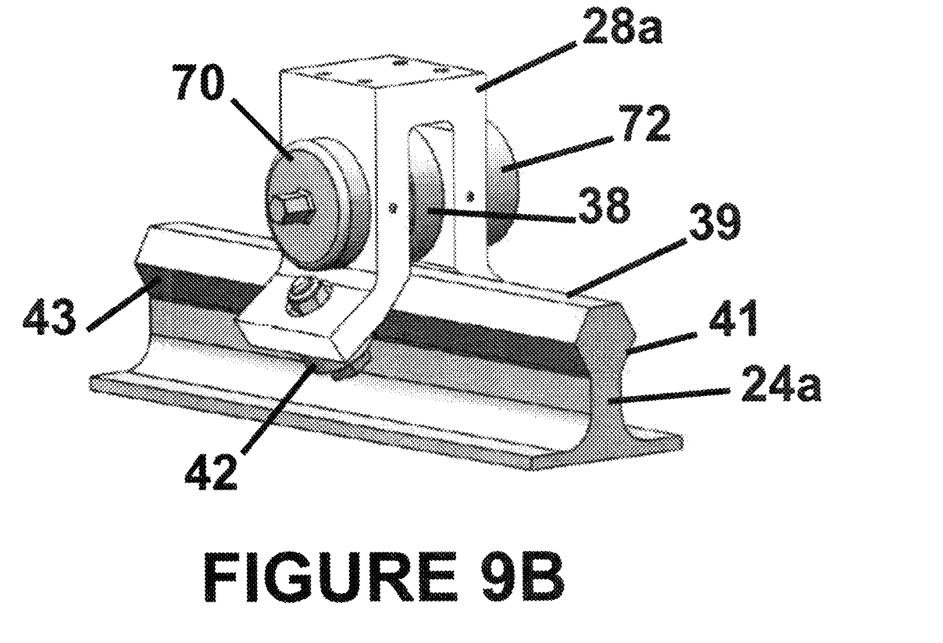
FIG. 9B is a perspective view of a complete yoke assembly riding on a hex rail.

FIG. 8 shows the top bearing 38 supported between the arms 52 and 54 of the yoke 28a. Two alignment bearings 40 and 42 bolted to flared portions 58 and 60 of the yoke 28a. FIG. 9 shows the yoke assembly shown in FIG. 8 attached to the hex rail 24a. The top bearing 38 rolls on the bearing surface 39, the alignment bearing 40 rolls on the bearing surface 41, and the alignment bearing 42 rolls on bearing surface 43. The other three yokes 28b, 28c, and 28d have three bearings attached in the same way as bearings attached to yoke 28a. Those other three yokes 28b, 28c, and 28d are attached to a respective hex rail 24a or 24b, as the case may be, in the same way that the yoke 28a is attached to hex rail 24a.

Highlights of This Positioning System

To recap, the intended purpose of the Tri-Bearing-System (TBS) described above is to enable a TV 10 or other flat panel visual display device to move horizontally along two walls 15 and 17 and traverse an inside corner formed by the two intersecting walls 15 and 17. Yoke assemblies 26a, 26b, 26c, and 26d are attached to the four corners of the rectangular TV 10 by rigid support arms or swivels 30a, 30b, 30c, and 30d. The support arms 30a, 30b, 30c, and 30d are rigid strips of support material. The support elements may be made of metal, carbon fiber, or other suitable structural support material able to support the weight of the TV 10. Each of the support elements 30a, 30b, 30c, and 30d is rotatable about the end points at which the support arm is attached to a respective yoke 28a, 28b, 28c, and 28d in a respective yoke assemblies 26a, 26b, 26c, and 26d. The support elements 30a, 30b, 30c, and 30d are also rotatable about the end point connected to the TV 10. The support arms thus act as swivels that permit the TV to traverse an inside corner formed by two intersecting walls 15 and 17. Each support arm passes through one of a pair of horizontal slots 14a and 14b in a false wall 12 that hides the mechanism of this invention. The protruding support arms holding the TV 10 in place are attached to a hexagon (hex) rail system, which in turn is permanently attached to a structural wall of the building. A user can easily and selectively move or position a TV 10 for more comfortable viewing from many different positions in a room. Because this positioning system is (1) a permanent structure, (2) is secured to the building by screws and adhesives, and (3) adds or enhances the value of the property, it qualifies as a "Capital Improvement" for tax purposes.

Inside Corner Movement

The positioning system can traverse an inside corner or a straight-line wall due to the constant positioning, repositioning, and interaction of a main top load supporting roller element bearing, and the two lower guide or alignment roller element bearings. The main top bearing carries the compression load exerted by the TV 10 and its components. Two lower alignment or guide bearings keep the top main load bearing centered on the top surface of the hex shaped track or rail. The two lower guide bearings act as horizontal movement limiters or stabilizers, by pressing against the two opposite surfaces of the straight or curved hex guide rail.

Straight-Line Movement

A top load supporting roller element bearing 38 and two alignment roller element bearings 40 and 42 working in tandem with one another along the hex rails 24a and 24b enable straight-line movement of the TV 10. The two alignment bearings 40 and 42 constantly maintain the top bearing's position on the hex rail, by limiting the top bearing's movement either right or left from the centerline of its respective hex rail 24a or 24b.

Hidden Mechanical Components Behind a False Wall

The mechanical parts of the positioning system for the wall mounted TV 10 are attached to the hex rail fixture 24a and 24b. The hex rail fixture lies behind the false wall 12 and is mounted to the building's structure. A supporting element at each corner of the TV 10 is attached to the hex rail fixture and protrudes through the false wall 12 to the room side of the false wall 12. The distance between the parallel horizontal slots 14a and 14b is wholly dependent on the size of the TV that is to be mounted on the wall. Two horizontal parallel slots 14a and 14b enable all support equipment in the positioning system to pass through the false wall 12 into the room side for attachment to the TV 10.

The purpose of carbon box frames shown in the drawings is to support the false sheetrock wall 12 in a way that does not impede the movement of the TV 10 and positions the false sheetrock wall 12 so that adequate space between the false wall 12 and the existing wall 15 or 17 accommodates the positioning system. The number of box frames used depends on how many are needed to support the hex rails 24a and 24b and also how many are needed to provide adequate rigidity to the false wall 12.

All of the mechanical mechanisms, which move with the TV 10 on the upper and lower hex rails 24a and 24b, are hidden behind a false sheetrock wall 12. TV support elements 30a, 30b, 30c, and 30d pass through the false sheetrock wall to the TV. Two horizontal slots 14a and 14b, each of which may approximately 0.5-inches wide, are formed in the false sheetrock wall 12. A first of these horizontal slots is located below the top carbon fiber box frame, and the second horizontal slot is located above the bottom carbon fiber box frame. One of the slots is slightly above the top TV swivels, and the other slot is slightly below the bottom TV swivels. The horizontal slots in the false wall enable the four arms connected to and projecting outward from hex rail yoke assemblies to be fastened to the swivels mounted on the right- and left-handed sides of the top and bottom of the TV.

The overall visual effect is, the TV can move horizontally while being suspended from the four protruding yoke extension arms, without being fastened to the wall. The effect is created by having the mid-section of the false wall secured independently to the carbon fiber standoffs from behind the wall . . . that is, without using the buildings 2×4s as a fastening point.

Conclusion

The Title, Technical Field, Background, Summary, Brief Description of the Drawings, Detailed Description, and Abstract are meant to illustrate the preferred embodiments of the invention and are not in any way intended to limit the scope of the invention. The scope of the invention is solely defined and limited in the claims set forth below.

The invention claimed is:

1. A positioning system adapted to support a planar object on first and second adjacent planar surfaces, the first and second planar surfaces being oriented at a predetermined angle with respect to one another so as to define an inside corner, the positioning system comprising:
   an elongated rail comprising a first linear portion extending in a first direction along the first planar surface, a second linear portion extending in a second direction along the second planar surface, and a curved portion connecting the first and second linear portions; and
   a support structure adapted to connect the planar object to the elongated rail; in which the elongated rail and the support structure are such that:
   the planar object is movable in the first direction with respect to the first planar surface;
   the planar object is movable in the second direction with respect to the second planar surface; and
   the planar object is movable from one of the planar surfaces to the other of the planar surfaces around the inside corner defined by the first and second adjacent planar surfaces; and in which:

the elongated rail has a hexagonal cross section that defines three bearing surfaces;

the support structure comprising a yoke that has first, second, and third roller element bearings, each of which respectively engage first, second, and third bearing surfaces defined by the hexagonal cross section of the elongated rail.

2. The positioning system of claim 1, in which each of the first, second, and third roller element bearings define a respective axis of rotation, each of the axes of rotation being at an angle of approximately 120 degrees with respect to the other two axes of rotation.

3. The positioning system of claim 1, in which the planar object is a display device.

4. The positioning system of claim 1, in which the planar object is a television.

5. The positioning system of claim 1, in which the planar object is a picture.

6. The positioning system of claim 1, in which the first and second planar surfaces are room surfaces oriented at a right angle with respect to one another.

7. A positioning system, adapted to support a planar object on adjacent first and second planar surfaces, the first and second planar surfaces being oriented at a predetermined angle with respect to one another so as to define an inside corner, the positioning system comprising:

a first elongated rail, suspended from the first and second planar surfaces, comprising a first linear portion extending in a first direction along the first planar surface, a second linear portion extending in a second direction along the second planar surface, and a first curved portion connecting the first and second linear portions;

a second elongated rail, suspended from the first and second planar surfaces, the second elongated rail being oriented parallel to the first elongated rail, the second elongated rail comprising a third linear portion extending in the first direction along the first planar surface, a fourth linear portion extending in the second direction along the second planar surface, and a second curved portion connecting the third and fourth linear portions; and a support structure adapted to connect the planar object to the first and second elongated rails;

in which:

the first elongated rail has a first hexagonal cross section that defines a first set of three bearing surfaces;

the second elongated rail has a second hexagonal cross section that defines a second set of three bearing surfaces; and the support structure comprises:

a first yoke having first, second, and third roller element bearings, each of first, second, and third roller element bearings respectively engaging first, second, and third bearing surfaces defined by the hexagonal cross section of the first elongated rail; and a second yoke having fourth, fifth, and sixth roller element bearings, each of fourth, fifth, and sixth roller element bearings respectively engaging fourth, fifth, and sixth bearing surfaces defined by the hexagonal cross section of the second elongated rail; and in which each of the first, second, and third roller element bearings define a respective first, second, and third axis of rotation, each of the first, second, and third axes of rotation being at an angle of approximately 120 degrees with respect to the other two of the first, second, and third axes of rotation; and each of the fourth, fifth, and sixth roller element bearings define a respective fourth, fifth, and sixth axis of rotation, each of the fourth, fifth, and sixth axes of rotation being at an angle of approximately 120 degrees with respect to the other two of the fourth, fifth, and sixth axes of rotation.

8. The positioning system of claim 7, further comprising:

a first support element adapted to connect the first yoke to a top edge of a rectangular planar display device; and a second support element adapted to connect the second yoke to a bottom edge of a rectangular planar display device.

9. The positioning system of claim 7, in which the support structure further comprises:

a third yoke having seventh, eighth, and ninth roller element bearings; each of seventh, eighth, and ninth roller element bearings respectively engaging the first set of three bearing surfaces defined by the hexagonal cross section of the first elongated rail and a fourth yoke having tenth, eleventh, and twelfth roller element bearings, each of the tenth, eleventh, and twelfth roller element bearings respectively engaging fourth, fifth, and sixth surfaces in the second set of three bearing surfaces defined by hexagonal cross section of the second elongated rail.

10. The positioning system of claim 9, in which:

each of the seventh, eighth, and ninth roller element bearings define a respective seventh, eighth, and ninth axis of rotation, each of the seventh, eighth, and ninth axes of rotation being at an angle of approximately 120 degrees with respect to the other two of the seventh, eighth, and ninth axes of rotation; and each of the tenth, eleventh, and twelfth roller bearings define a respective tenth, eleventh, and twelfth axis of rotation, each of the tenth, eleventh, and twelfth axes of rotation being at an angle of approximately 120 degrees with respect to the other two of the tenth, eleventh, and twelfth axes of rotation.

11. A positioning system adapted to permit positioning a visual display device suspended on one of more flat surfaces horizontally across the one or more flat surfaces, comprising:

a hex rail, having a hexagonal cross section that defines at least three bearing surfaces, the hex rail having a first straight portion that extends horizontally across a first flat surface, a second straight portion that extends horizontally across a second flat surface, and a curved portion connecting the first straight portion to the second straight portion, the first flat surface and the second flat surface forming an inside corner; and a tri-bearing yoke assembly connected to the hex rail comprising a yoke supporting three roller element bearings, each of the three roller element bearings traveling along one of the at least three bearing surfaces.

12. The positioning system of claim 11, further comprising:

a false wall covering the hex rail and the tri-bearing yoke assembly.

13. The positioning system of claim 7, in which the first and second elongated rails and the support structure are such that:

the planar object is movable in the first direction with respect to the first planar surface;

the planar object is movable in the second direction with respect to the second planar surface; and the planar object is movable from one of the planar surfaces to the other of the planar surfaces around the inside corner defined by the adjacent first and second planar surface.

\* \* \* \* \*